Figure 1:
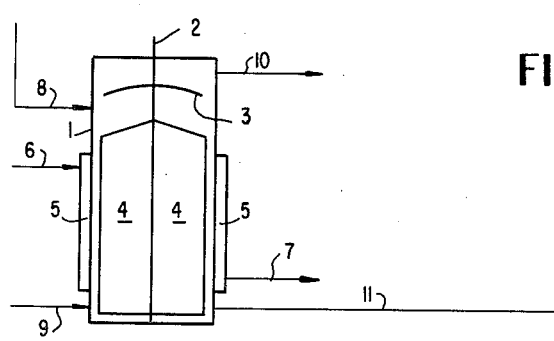

Dec. 14, 1965   HUGH E. TEMPLETON ETAL   3,223,145
EVAPORATIVE CONCENTRATION OF AQUEOUS UREA
Filed May 20, 1964   3 Sheets-Sheet 1

INVENTORS
HUGH E. TEMPLETON
ROBERT N. SUMMERVILLE
BY
McLean and Dibble
ATTORNEYS Dec. 14, 1965 HUGH E. TEMPLETON ETAL 3,223,145
EVAPORATIVE CONCENTRATION OF AQUEOUS UREA
Filed May 20, 1964 3 Sheets-Sheet 2

INVENTORS
HUGH E. TEMPLETON
ROBERT N. SUMMERVILLE
BY McLean and Dibble
ATTORNEYS Dec. 14, 1965   HUGH E. TEMPLETON ETAL   3,223,145
EVAPORATIVE CONCENTRATION OF AQUEOUS UREA
Filed May 20, 1964   3 Sheets-Sheet 3
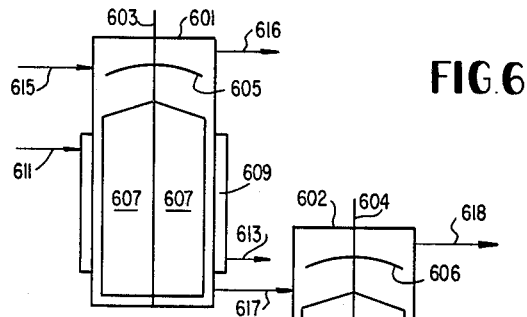
FIG.6
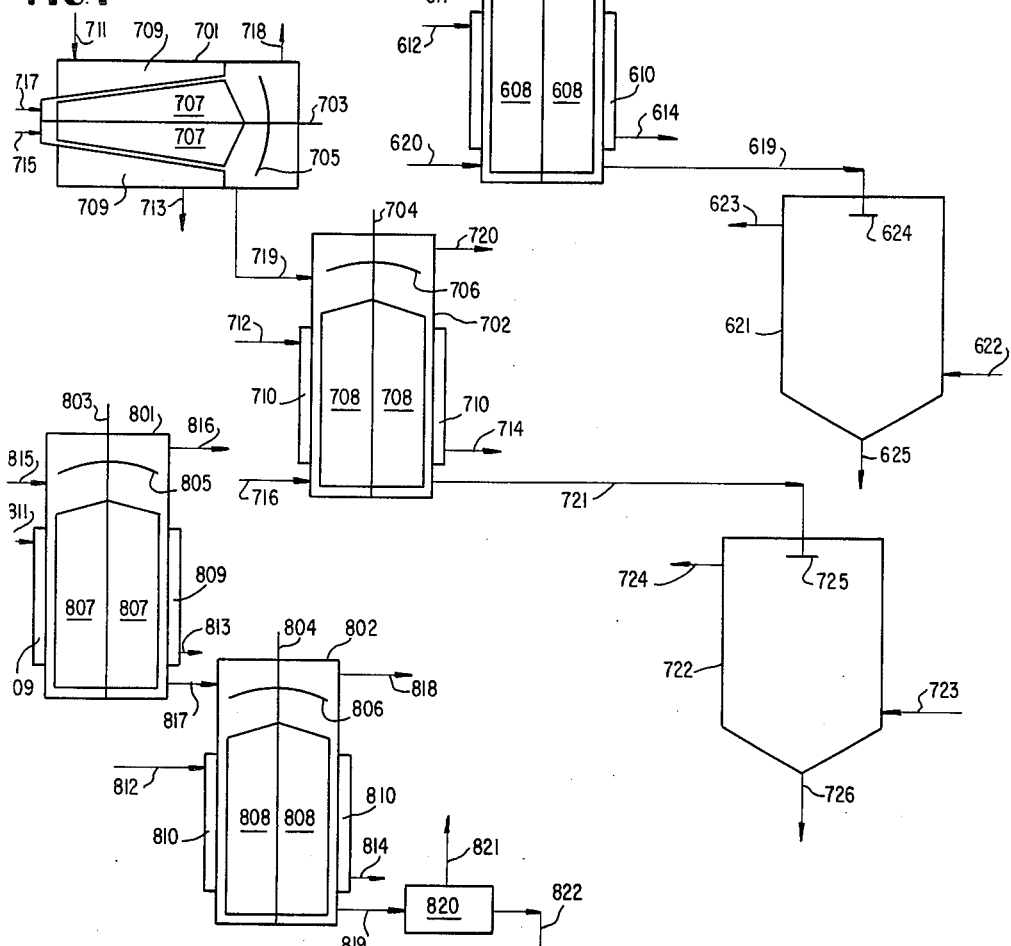
FIG.7
FIG.8
INVENTORS
HUGH E. TEMPLETON
ROBERT N. SUMMERVILLE
BY
McLean and Dibble
ATTORNEYS

United States Patent Office

3,223,145
Patented Dec. 14, 1965

3,223,145
EVAPORATIVE CONCENTRATION OF
AQUEOUS UREA
Hugh E. Templeton, Kamakura-shi, Japan, and Robert N. Summerville, Cranford, N.J., assignors, by mesne assignments, to Allied Chemical Corporation, New York, N.Y., a corporation of New York
Filed May 20, 1964, Ser. No. 368,931
18 Claims. (Cl. 159—47)

This application is a continuation-in-part of applications Serial Nos. 53,507, filed September 1, 1960 which, in turn, is a continuation-in-part of application Serial No. 702,291, filed December 12, 1957 and also is a continuation-in-part of application Serial No. 809,857, filed April 29, 1959 which, in turn, was a continuation-in-part of application Serial No. 702,471, filed December 12, 1957; 702,440, filed December 12, 1957; 702,335 filed December 12, 1957; 809,804, filed April 29, 1959 which, in turn, is a continuation-in-part of application Serial No. 702,438, filed December 12, 1957; and 809,856, filed April 29, 1959 which, in turn, is a continuation-in-part of application Serial No. 702,439, filed December 12, 1957. All of said prior applications are now abandoned.

Our invention relates to the dehydration of urea and to the making of urea in prill form.

It is well known in the art to prepare urea by reacting carbon dioxide and ammonia at elevated conditions of temperature and pressure, water being formed as a by-product. Note Petroleum Refiner, vol. 36, No. 11, p. 287. Typically, the urea melt flowing from the system in which such a process is carried out can have a temperature within the range from about 200° F. to about 290° F. and will be composed of from about 70 percent to about 90 percent by weight of urea and from about 30 percent to about 10 percent by weight of water.

It is also known to subject the urea melt to a single conventional vacuum evaporation step to remove water, thereby producing urea in more dehydrated form containing from about 3 percent to about 5 percent by weight of water, and then to pass the urea containing that amount of water to a prilling tower wherein urea prills are formed.

When the operation is carried out in this manner, it is found that the urea prills formed contain from about one percent to about 5 percent by weight of water and are undesirably soft, so that they tend to pick up further amounts of water and are not mechanically strong. Such prills can be further dried in an oven drier with hot air but, when this is done, hard, dense and mechanically strong prills which have a low tendency to pick up water are not obtained. The prills produced as described can be treated to reduce caking by coating them with a suitable material, but such a step is expensive, yields a contaminated prill, and moreover does not provide a prill of high mechanical strength.

It would be desirable to have a method for preparing urea prills which are at the same time mechanically strong and dense so that they have a low tendency to pick up water. Such prills can be provided by feeding to the prilling tower urea of very low water content, so that the prills produced in the prilling tower are of low water content and hence hard and mechanically strong.

However, difficulties are encountered in suitably preparing molten urea of low water content as a prilling tower feed. Thus, if the single conventional vacuum evaporation step is resorted to when dehydrating the urea melt to provide a prilling tower feed of low water content, it is found that the biuret content of the dehydrated urea fed to the prilling tower is excessive, the biuret being formed by maintaining the urea under elevated temperature conditions for an excessive period of time.

In experimental work underlying our invention, it has been found that the problem of dehydrating the urea melt to a low water content urea suitable for feeding to a prilling tower to provide dense, hard, mechanically strong prills of low water and biuret content is a somewhat complicated problem. The dehydration must be carried out as rapidly as possible and at as low a temperature as possible in order to minimize biuret formation. However, conditions which are optimum for dehydrating urea of a given water content are not necessarily optimum when dehydrating urea of a different water content. This is because the partial pressure of water above liquid urea-water mixtures at their crystallization temperatures increases as the water content decreases from 30 percent to 10 percent by weight, whereas the partial pressure of water above liquid urea-water mixtures at their crystallization temperatures decreases as the water content decreases below 10 percent by weight. Thus, the following table shows the partial pressure of water vapor in p.s.i.a. above urea-water mixtures at their crystallization temperatures as related to water content in percent by weight.

| Water concentration, weight percent: | Partial pressure of water, p.s.i.a. |
|---|---|
| 30 | 1.65 |
| 20 | 3.00 |
| 18 | 3.25 |
| 16 | 3.53 |
| 14 | 3.75 |
| 12 | 3.83 |
| 10 | 3.85 |
| 8 | 3.68 |
| 6 | 3.30 |
| 4 | 2.71 |

It will be noted that the curve relating partial pressure of water to urea content reaches a maximum at approximately 10 percent by weight water concentration. This means that if only one evaporation step is employed in dehydrating the urea melt to provide a prilling tower feed of low water content optimum conditions cannot be employed to effect the dehydration, unless special means are resorted to, although the use of optimum conditions is necessary to minimize biuret formation. The curve has been published in Chimie et Industrie 60 28 (1948 Frejaques) and the data from this curve set forth in the above table is more accurate than the corresponding data presented in our prior applications and this specification is correlated to the more accurate data.

In accordance with our invention, we have provided an improved process for dehydrating urea melts so that they then can be prilled in the conventional manner to provide urea prills which are mechanically strong, dense, of low tendency to pick up water and of low biuret content. The process of our invention contemplates using as a starting material a urea melt such as one which conventionally can be formed in urea synthesis, but advantageously one prepared in accordance with a procedure described below in Example III which will provide a urea melt with a biuret content less than about 0.5%. Such a melt generally contains from about 5 or 10 percent by weight to about 20 or 30 percent by weight of water, the remainder being essentially urea, and has a temperature of from about 200° F. to about 260 or 290° F. This type of melt is hereinafter referred to as "such a melt."

In accordance with our invention, such a melt is evaporated to produce a molten urea containing not more than 1.5 percent by weight of water (preferably not more than 0.5 percent by weight of water and generally from about 0.25 to 0.75 percent by weight of water) and having a temperature within the range from about 270° F. to 285° F.

In accordance with our preferred process, such a melt is evaporated in such manner that the vapor pressure of water over the urea melt is greater than the vapor pressure which would be in equilibrium with the urea melt at its crystallization temperature as evaporation progresses but not more than 20 mm. of mercury (generally 5 to 20 mm. of mercury) greater than the said equilibrium water vapor pressure, for a substantial portion of the evaporative period when the water concentration in the melt is less than 10 percent by weight. When the operation is performed in this manner, biuret formation in the urea melt thus evaporated is minimized while at the same time the formation of urea crystals during the evaporation is avoided.

In accordance with a first embodiment of our process, such a melt is subjected to an evaporation step which is carried out at a pressure of from 4 to 19.7 p.s.i.a. to provide a partially dehydrated urea containing not more than 1.5 percent by weight of water, preferably containing from 0.25 to 0.5 percent by weight of water; less than about 1 percent biuret, preferably less than about 0.85 percent biuret; and having a temperature within the range from 270° or 275° F. to 285° or 310° F. (preferably about 295 to 305° F.); this being accomplished while passing the molten urea undergoing dehydration countercurrently to a stream of air or other inert gas such as flue gas, ammonia, nitrogen, carbon dioxide and the like. The evaporation can be carried out in any conventional evaporator of the type which is used to evaporate heat-sensitive materials. The conditions generally employed in the evaporation step include a residence time for the urea melt in the evaporator of about 20 seconds or less, e.g. about 1 to 20 seconds, usually less than about 10 seconds. Thus, the evaporation zone should not be packed with particulate contact material. The inert gas, e.g. air, employed in the evaporation step generally contains a dew point of less than about 60° F., for instance 45° F., a temperature (e.g. about 270 to 300° F.) sufficient to avoid cooling the urea to its solidification temperature, and a flow rate sufficient to reduce the water content of the urea to 1.5 percent or less while avoiding materially overcoming the gravity flow of the liquid urea in the evaporation zone, i.e. there should not be undue amounts of urea in the off-gas. The inert gas is preferably chilled, its water content is reduced, and it is heated for use in the evaporation step. The gas, e.g. air, flow rate through the evaporation zone is dependent on the water content of the urea in the zone and the dew point of the gas. It can be expressel in terms of the weight, e.g. pounds, of gas per weight, e.g. pounds, of water to be removed from the urea and this will generally range from about 3 to 8 pounds of gas per pound of water to be removed and it can range from about .3 to 8 pounds of gas per pound of water to be removed or even somewhat more or less, depending upon conditions. Suitably the evaporator is a centrifugal thin-film unit, of which various types are described in Paper No. 57–HT–22 by Gudheim and Donovan, Heat Transfer in Thin-Film, Centrifugal Processing Units presented at the ASME-AIChe Joint Heat Transfer Conference, August 11–14, 1957, State College, Pennsylvania.

By this means there is provided a substantially dehydrated urea of low tendency to pick up water and of low biuret content. The dehydrated urea can be flaked, pelletized or granulated in the conventional manner. On the other hand, the dehydrated urea can then be fed in molten form to a prilling tower operated in the conventional manner to form urea prills of the desired characteristics with respect to mechanical strength, density, water absorption and biuret content.

EXAMPLE I

This example is to be considered in connection with FIGURE 1 of the accompanying drawings as exemplifying the first embodiment of the present invention. In FIGURE 1, the numeral 1 represents a vertical straight-sided centrifugal thin-film evaporation unit provided with a rotating shaft 2 having attached thereto a centrifugal separator 3 and rotating plates 4. Evaporation unit 1 is also provided with a heating jacket 5 into which the steam required for evaporating the water is introduced through line 6, condensate being removed through line 7.

Through line 8 there is passed at the rate of 5 tons per hour a urea melt produced in the conventional manner. This urea melt contains 15 percent of water, the remainder being essentially urea, and is at a temperature of 250° F. Through line 9 there is introduced air having a temperature of 280° F. at the rate of 2500 pounds per hour, although this amount can vary from within the range of 800 pounds per hour to 6000 pounds per hour or even somewhat more or less, depending upon conditions. Evaporator 1 is operated at a pressure of 9 p.s.i.a. Water vaporized in evaporator 1 is removed by means of line 10, along with the air introduced through line 9, and line 10 is connected to a suitable source of vacuum. The partially dehydrated urea is pumped in molten form through line 11, and has a water content of 0.5 percent by weight and a temperature of 280° F. The partially dehydrated urea flowing through line 11 is a desirable feed to a flaking, pelletizing or granulation operation, as has been mentioned above. However, in the process of FIGURE 1 it is subjected to prilling.

The numeral 12 represents a conventional prilling tower, suitably having a diameter of approximately 40 feet and a height of 100 feet. Atmospheric air is introduced into tower 12 through line 13 and is removed by means of line 14. The numeral 15 represents a conventional rotating device of the type conventionally used in prilling towers for the purpose of finely dividing the molten urea so that it will be formed into prills when falling downwardly through the tower countercurrent to the air. In tower 12, conditions are adjusted in such manner that the urea prills collected at the bottom of the tower are cooled to a temperature of from approximately 120 to 150° F. The prills are removed from the bottom of the tower by means of line 16 and are dense, hard, mechanically strong, of low tendency to pick up water and have a biuret content of approximately 0.9 percent by weight.

In building a plant, it is advisable that line 11 be made as short as possible in order that biuret formation between the evaporator and the prilling tower will be minimized.

In accordance with a modification of the first embodiment of our invention, the urea melt dehydrated as described above is subjected to a second evaporation step in such manner that the vapor pressure of water over the urea melt is greater than the vapor pressure which would be in equilibrium with the urea melt at its crystallization temperature as evaporation progresses but not more than 20 mm. of mercury (generally 5 to 20 mm. of mercury) greater than the said equilibrium water vapor pressure. This second evaporation step results in further dehydration of the urea melt, but at the same time biuret formation in the urea melt is minimized and the formation of urea crystals during the evaporation is avoided.

Thus, in accordance with this first embodiment of our invention, the urea melt produced as a result of the first evaporation is subjected to a second evaporation step which is carried out at an absolute pressure of from 5 to 13 mm. of mercury to provide a more completely dehydrated urea containing not more than 0.20 percent by weight of water, and preferably containing from 0.15 to 0.20 percent by weight of water, and having a temperature within the range from 272° F. to 285° F.

As a result of the second dehydration step, there is provided a further dehydrated urea of low tendency to pick up water and of low biuret content. This dehydrated urea can be flaked, pelletized or granulated in the conventional manner. On the other hand, the dehydrated urea can then be fed in molten form to a prilling tower operated in the conventional manner to form urea prills of the desired characteristics with respect to mechanical strength, density, water absorption and biuret content.

EXAMPLE II

Figure 2:
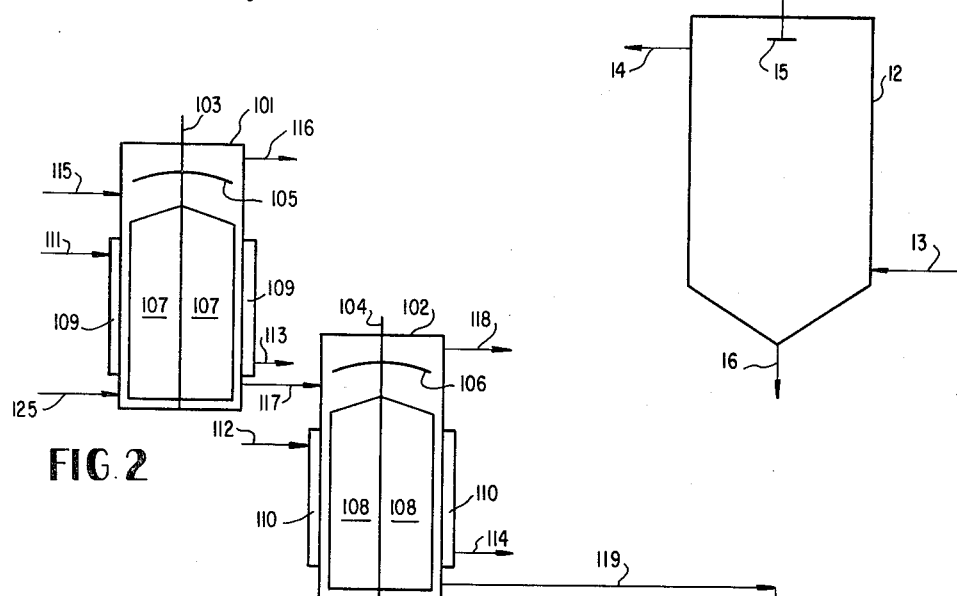

This example is to be considered in connection with FIGURE 2 of the drawings as exemplifying a modification of the first embodiment.

In FIGURE 2, the numerals 101 and 102 represent vertical straight-sided centrifugal thin-film evaporation units which are provided, respectively, with rotating shafts 103 and 104 having attached thereto centrifugal separators 105 and 106 and rotating plates 107 and 108. Evaporation units 101 and 102 are also provided, respectively, with heating jackets 109 and 110 into which the steam required for evaporating the water is introduced through lines 111 and 112, condensate being removed through lines 113 and 114.

Through line 115 there is passed at the rate of 5 tons per hour a urea melt produced in the conventional manner. This urea melt contains 15 percent of water, the remainder being essentially urea, and is at a temperature of 250° F. Through line 125 there is introduced air having a temperature of 280° F. at the rate of 5250 pounds per hour, although this amount can vary from within the range of 800 pounds per hour to 6000 pounds per hour or even somewhat more or less, depending upon conditions. Evaporator 101 is operated at a pressure of 14.7 p.s.i.a. Water vaporized in evaporator 101 is removed by means of line 116, along with the air introduced through line 125. The partially dehydrated urea flows in molten form through line 117, and has a water content of 0.5 percent by weight and a temperature of 280° F.

The partially dehydrated urea flowing through line 117 is a desirable feed to a flaking, pelletizing or granulation operation. However, in the process of FIGURE 2 it is subjected to further evaporation.

Thus, by means of line 117 the partially dehydrated melt is introduced into second stage evaporator 102, which is provided with vapor outlet 118 connected to a suitable source of vacuum. Evaporator 102 is operated at a pressure of 10 mm. of mercury absolute, and the molten urea dehydrated therein is pumped in molten form through line 119, contains 0.20 percent by weight of water and is at a temperature of 275° F. The more completely dehydrated urea flowing through line 119 is a desirable feed to a flaking, pelletizing or granulation operation. However, in the process of FIGURE 2 it is subjected to prilling.

The numeral 120 represents a conventional prilling tower, suitably having a diameter of approximately 40 feet and a height of 100 feet. Atmospheric air is introduced into tower 120 through line 121 and is removed by means of line 122. The numeral 123 represents a conventional rotating device of the type conventionally used in prilling towers for the purpose of finely dividing the molten urea so that it will be formed into prills when falling downwardly through the tower countercurrent to the air. In tower 120, conditions are adjusted in such manner that the urea prills collected at the bottom of the tower are cooled to a temperature of from approximately 120 to 150° F. The prills are removed from the bottom of the tower by means of line 124 and are dense, hard, mechanically strong, of low tendency to pick up water and have a low biuret content.

In building a plant, it is advisable that lines 117 and 119 be made as short as possible in order that biuret formation will be minimized.

EXAMPLE III

Figure 3:
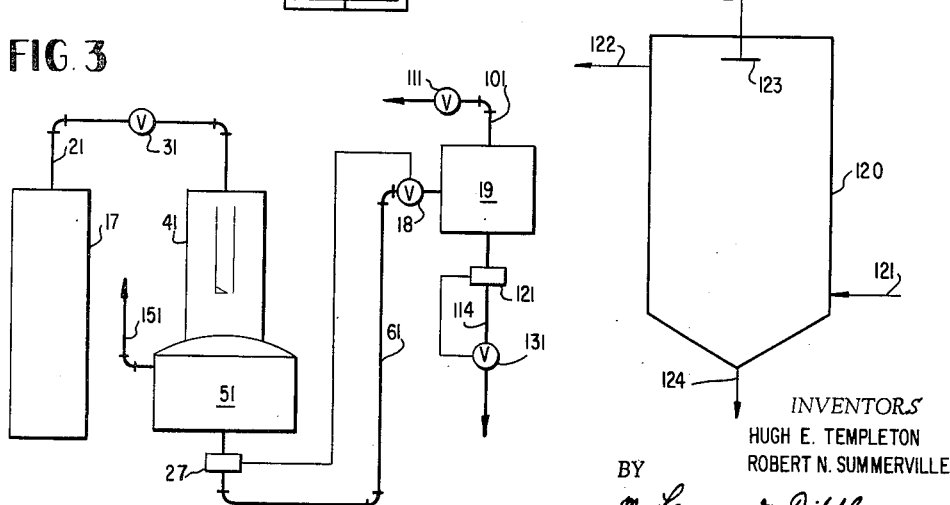

Referring to FIGURE 3 of the drawing, numeral 17 represents an autoclave connected to line 21, which leads through valve 31, heat exchanger 41, primary separator 51, gas line 151, level controller 27 which operates valve 18 in line 61, secondary separator 19, gas line 101, pressure control valve 111, and level controller 121 which operates valve 131 in line 114.

Six and one-half tons per hour of carbamate, five tons per hour of urea, and 1.5 tons per hour of water, forming a process stream from autoclave 17, are conducted through line 21, at a pressure of approximately 3,000 p.s.i.g., through a pressure releasing valve 31, where the pressure is reduced to about 220 p.s.i.g., and into heat exchanger 41 where the process stream is heated to a temperature of 270° F. The heated process stream is conducted into primary separator 51 at a temperature of about 270° F. and a pressure of about 220 p.s.i.g. for about 25 seconds to produce a liquid product containing 5 tons per hour of urea, approximately 0.3 ton per hour of carbamate and 1.2 tons per hour hour of water. The conditions generally employed in the primary separator include a temperature from about 250° to 275° F. and a pressure from about 50 to 300 p.s.i.g. The residence time for the process stream in the primary separator is generally from about 20 to 30 seconds. The carbamate in the primary separator is desirably decomposed into ammonia and $CO_2$ gases, this decomposition being primarily a function of temperature and pressure. Usually, at least about 85 or 95% of the carbamate is decomposed in the separator, however, this decomposition would be undesirably retarded at temperatures lower than 250° F. and in addition, the lower temperatures may provide a product which can experience a drop in temperature sufficient to freeze the product when passing to the secondary separator (described below), where flashing occurs.

The tendency to form biuret is low under the conditions generally employed in the primary separator since the high pressure and the presence of ammonia and $CO_2$ suppress biuret formation.

Continuing with the specific examples, 6.2 tons per hour of carbamate are decomposed into ammonia and $CO_2$ gases which together with 0.3 ton per hour of water are removed from the separator 51 through line 151. The liquid product is maintained at a minimum level in the separator 51 by level controller 27 and is conducted through line 61 and level control valve 18 into secondary separator 19. In the secondary separator 19, the pressure is reduced to 3 p.s.i.g. and essentially the balance of the carbamate (0.3 ton per hour) is decomposed into ammonia and $CO_2$ gas which, together with 0.3 ton per hour of water, are removed through line 101 and pressure control valve 111. The secondary separator is at 245° F. and the liquid has a residence time of 4 seconds.

The conditions generally employed in the secondary separator include a temperature from about 200 to 260° F., a pressure from about 0 to 12 p.s.i.g., and a residence time of about 1 to 5 seconds. Lower temperatures can be employed with lower pressures within these ranges to enhance the removal of water. Temperatures above 260° F. tend to promote biuret formation, however, if the product from the primary separator, at a temperature for instance of 225° F., is heated instantaneously in the secondary separator to a temperature of 280° F., for instance, followed by an expeditious dehydration of the product of the secondary separator in the dehydration procedure of Example I, for instance, the formation of a material amount or biuret can be avoided. The secondary separator functions generally to remove ammonia, $CO_2$, carbamate and probably a little water.

Continuing with the specific example, the liquid product is maintained at a minimum level in separator 19 by level controller 121 and is conducted through line 114 and level control valve 131 to the evaporator. The flow of liquid product consists of 5 tons per hour of urea and 0.9 ton per hour of water, which is a melt containing about 15 percent water. The melt at this point will contain less than 0.4 percent biuret. Residence time of the process stream from valve 31 to valve 18 in this example is approximately 20 to 30 seconds and residence time from valve 18 through valve 131 is about 1 to 5 seconds. A particularly desirable advantage of following the procedure in this example resides in the production of a urea melt, for use in the dehydration procedure described above in Examples I and II, which is low in biuret content, for instance, with a biuret content of less than 0.5 or 0.4 percent.

EXAMPLE IV

This example is to be considered in connection with FIGURE 1 of the accompanying drawings. In FIGURE 1, the numeral 1 represents a vertical straight-sided centrifugal thin-film evaporation unit provided with a rotating shaft 2 having attached thereto a centrifugal separator 3 and rotating plates 4. Evaporation unit 1 is also provided with a heating jacket 5 into which the steam required for evaporating the water is introduced through line 6, condensate being removed through line 7.

Through line 8 there is passed at the rate of 5 tons per hour a urea melt produced according to the procedure described above in Example III. The urea melt contains 15 percent of water, and less than 0.5 percent biuret, the remainder being essentially urea, and is at a temperature of 250° F. Through line 9 there is introduced air having a dew point of 45° F. and a temperature of 280° F. at the rate of 5,270 pounds per hour. Evaporator 1 is operated at a pressure of 14.7 p.s.i.a. Water vaporized in evaporator 1 is removed by means of line 10, along with the air introduced through line 9. The time taken for the urea melt to pass down evaporator 1 is 10 seconds. The partially dehydrated urea flows in molten form through line 11, and has a water content of 0.5 percent by weight, a biuret content of 0.9%, and a temperature of 300° F. The partially dehydrated urea flowing through line 11 is subjected to prilling.

The numeral 12 represents a conventional prilling tower, suitably having a diameter of approximately 40 feet and a height of 100 feet. Atmospheric air is introduced into tower 12 through line 13 and is removed by means of line 14. The numeral 15 represents a conventional rotating device of the type conventionally used in prilling towers for the purpose of finely dividing the molten urea so that it will be formed into prills when falling downwardly through the tower countercurrent to the air. In tower 12, conditions are adjusted in such manner that the urea prills collected at the bottom of the tower are cooled to a temperature of from approximately 120° to 150° F. The prills are removed from the bottom of the tower by means of line 16 and are dense, hard, mechanically strong, of low tendency to pick up water and have a biuret content of approximately 0.9 percent by weight.

In building a plant, it is advisable that line 11 be made as short as possible in order that biuret formation between the evaporator and the prilling tower will be minimized.

In accordance with a further embodiment of our invention, the urea melt dehydrated as described above is subjected to a second evaporation step, preferably in such manner that the vapor pressure of water over the urea melt for a substantial portion of the evaporative period is greater than the vapor pressure which would be in equilibrium with the urea melt at its crystallization temperature as evaporation progresses but not more than 20 mm. of mercury (generally 5 to 20 mm. of mercury) greater than the said equilibrium water vapor pressure. This second evaporation step results in further dehydration of the urea melt, but at the same time biuret formation in the urea melt is minimized and the formation of urea crystals during the evaporation is avoided.

Thus, in accordance with this embodiment of our invention, the urea melt produced as a result of the first evaporation is subjected to a second evaporation step which is carried out at an absolute pressure of from 5 to 13 mm. of mercury to provide a more completely dehydrated urea containing not more than 0.20 percent by weight of water, and preferably containing from 0.15 to 0.20 percent by weight of water, and having a temperature within the range from 272° or 275° F. to 285° or 310° F. Preferably, the residence time in the second evaporation step is about 3 to 5 seconds.

As a result of the second dehydration step, there is provided a further dehydrated urea of low tendency to pick up water and of low biuret content. This dehydrated urea can be flaked, pelletized or granulated in the conventional manner. On the other hand, the dehydrated urea can then be fed in molten form to a prilling tower operated in the conventional manner to form urea prills of the desired characteristics with respect to mechanical strength, density, water absorption and biuret content.

EXAMPLE V

This example is to be considered in connection with FIGURE 2.

In FIGURE 2, the numerals 101 and 102 represent vertical straight-sided centrifugal thin-film evaporation units which are provided, respectively, with rotating shafts 103 and 104 having attached thereto centrifugal separators 105 and 106 and rotating plates 107 and 108. Evaporation units 101 and 102 are also provided, respectively, with heating jackets 109 and 110 into which the steam required for evaporating the water is introduced through lines 111 and 112, condensate being removed through lines 113 and 114.

Through line 115 there is passed at the rate of 5 tons per hour a urea melt produced according to the procedure described above in Example III. This urea melt contains 15 percent of water, less than 0.5% biuret, the remainder being essentially urea, and is at a temperature of 250° F. Through line 125 there is introduced air having a dew point of 45° F. and a temperature of 275° F. at the rate of 5,270 pounds per hour. Evaporator 101 is operated at a pressure of 14.7 p.s.i.a. Water vaporized in evaporator 101 is removed by means of line 116, along with the air introduced through line 125. The partially dehydrated urea flows in molten form through line 117, and has a water content of 1.5 percent by weight and a temperature of 275° F. The residence time of the urea in this step is 10 seconds.

The partially dehydrated urea flowing through line 117 is a desirable feed to a flaking, pelletizing or granulation operation. However, in the process of FIGURE 2 it is subjected to further evaporation.

Thus, by means of line 117 the partially dehydrated melt is introduced into second stage evaporator 102, which is provided with vapor outlet 118 connected to a suitable source of vacuum. Evaporator 102 is operated at a pressure of 10 mm. of mercury absolute, and the molten urea dehydrated therein is pumped in molten form through line 119, contains 0.20 percent by weight of water, 0.9% biuret and is at a temperature of 275° F. The residence time for the urea in this step is 4 seconds. The more completely dehydrated urea flowing through line 119 is a desirable feed to a flaking, pelletizing or granulation operation. However, in the process of FIGURE 2 it is subjected to prilling.

The numeral 120 represents a conventional prilling tower, suitably having a diameter of approximately 40 feet and a height of 100 feet. Atmospheric air is introduced into tower 120 through line 121 and is removed by means of line 122. The numeral 123 represents a conventional rotating device of the type conventionally used in prilling towers for the purpose of finely dividing the molten urea so that it will be formed into prills when falling downwardly through the tower countercurrent to the air. In tower 120, conditions are adjusted in such manner that the urea prills collected at the bottom of the tower are cooled to a temperature of from approximately 120 to 150° F. The prills are removed from the bottom of the tower by means of line 124 and are dense, hard, mechanically strong, of low tendency to pick up water and have a low biuret content.

In building a plant, it is advisable that lines 117 and 119 be made as short as possible in order that biuret formation will be minimized.

When following the process of the present invention, a hard prill (one which will not disintegrate upon subjection to high finger pressures as experienced when it is pressured between the fingernails of a man's thumb and forefinger) is provided with a low tendency to pick up water, and with a low biuret content. This results in not only the obviation of the conventional drying step employed to dry the prills, but it also provides a hard low-biuret prill as distinguished from the conventionally dried prill which will crumble when subjected to low finger pressures. Additionally, the following information illustrates that prills of Sample I (prills prepared in accordance with the present invention) are from about 2½ to 3 times as hard as the prills of Sample II (prepared by a process illustrative of the prior art prilling processes) which were dried subsequent to prilling to obtain a comparable final water content.

*Information on prill hardness*

| Sample No. | I<br>Present Process Without Drying After Prilling | II<br>Prior Art Process With Drying After Prilling |
|---|---|---|
| Water: | | |
| Final, wt. percent | 0.46 | 0.36 |
| Melt to priller, Wt. percent | 0.70 | 5.0 |
| Biuret, Final Wt. percent | 0.50 | 1.09 |
| Crushing Strength,[1] Grams: | | |
| High | 1,600 | 496 |
| Low | 500 | 206 |
| Average | 909 | 307 |

[1] Run on screened sample of 20 prills chosen at random.

Photographs of typical prills corresponding to the prills on which the hardness tests were run show that the prills made from the lower concentration of water in the melt (Sample No. I), are glossy and appear to be much more crystalline than those (Sample No. II) made from the higher concentration of water in the melt and subsequently dried to comparable water content. In addition, the harder prills are more nearly uniform than the softer prills. The uniformity would have a tendency to give better flowing characteristics for mechanical fertilizer applications.

In accordance with a second embodiment of our process, such a melt is subjected to a first stage evaporation which is carried out at a pressure of from 3.85 to 4.25 p.s.i.a. to provide a partially dehydrated urea containing from 2 to 3 percent by weight of water and having a temperature within the range from 290° F. to 310° F. The first stage evaporation can be carried out in any conventional evaporator of the type which is used to evaporate heat-sensitive materials. Suitably the evaporator is a centrifugal thin-film unit, of which various types are described in Paper No. 57–HT–22 by Gudheim and Donovan, Heat Transfer in Thin-Film, Centrifugal Processing Units presented at the ASME-AIChE Joint Heat Transfer Conference, August 11–14, 1957, State College, Pennsylvania.

In the second stage of our process, the partially dehydrated urea produced in the first stage, containing from 2 to 3 percent by weight of water and having a temperature within the range from 290° F. to 310° F., is subjected to a flashing operation which is carried out at a pressure within the range from 0.2 to 0.5 p.s.i.a. This flashing operation provides a more completely dehydrated urea which contains from 0.25 to 1 percent by weight of water and has a temperature within the range from 270° F. to 285° F. The more completely dehydrated urea produced as a result of the flashing operation can then be fed in molten form to a prilling tower to form urea prills of the desired characteristics with respect to mechanical strength, density, water absorption and biuret content.

EXAMPLE VI

Figure 4:
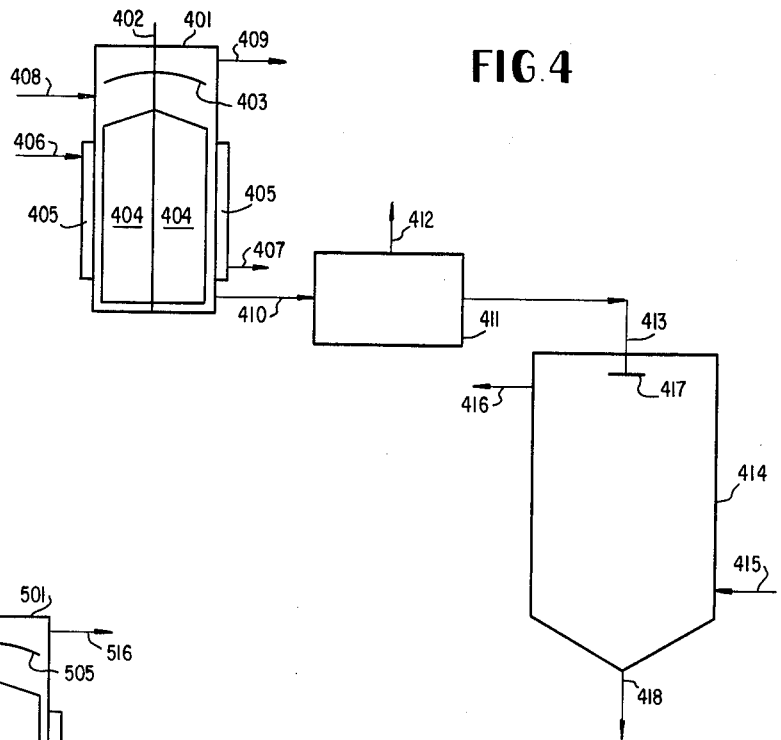

This example is to be considered in connection with FIGURE 4 of the accompanying drawing as exemplifying the second embodiment of the present invention.

In the drawing, the numeral 401 represents a vertical straight-sided centrifugal thin-film evaporation unit which is provided with a rotating shaft 402 having attached thereto a centrifugal separator 403 and rotating plates 404. Evaporation unit 401 is also provided with a heating jacket 405 into which the steam required for evaporating the water is introduced through line 406, condensate being removed through line 407.

Through line 408 there is passed at the rate of 5 tons per hour a urea melt produced in the conventional manner. This urea melt contains 15 percent by weight of water, the remainder being essentially urea, and is at a temperature of 250° F. Water vaporized in evaporator 401 is removed by means of line 409 which is connected to a suitable source of vacuum operated in such manner that the pressure in evaporator 401 is 4 p.s.i.a. The partially dehydrated urea passes in molten form through line 410 and has a water content of 2.5 percent by weight and a temperature of 310° F. By means of line 410 the partially dehydrated urea is introduced into flash drum 411 which is provided with vapor outlet 412 for removing water vapor. Line 412 is connected to a suitable source of vacuum to maintain the pressure in flash drum 411 at 0.5 p.s.i.a. The molten urea dehydrated in flash drum 411 is pumped in molten form through line 413 and has a water content of 0.5 percent by weight and a temperature of 280° F.

The numeral 414 represents a conventional prilling tower, suitably having a diameter of approximately 40 feet and a height of 100 feet. Atmospheric air is introduced into tower 414 by means of line 415 and is removed by means of line 416. The numeral 417 represents a conventional rotating device of the type commonly used in prilling towers for the purpose of finely dividing the molten urea so that it will be formed into prills when falling downwardly through the tower countercurrent to the air. In tower 414, conditions are adjusted in such manner that the urea prills collected at the bottom of the tower are cooled to a temperature of from approximately 120 to 150° F. The prills are removed from the bottom of the tower by means of line 418 and are dense, hard, mechanically strong, of low tendency to pick up water and have a biuret content of approximately 0.9 percent by weight.

In building a plant, it is advisable that lines 410 and 413 be made as short as possible in order that biuret formation between the evaporation step and the flashing step and between the flashing step and the prilling tower will be minimized.

In accordance with a third embodiment of our process, such a melt is subjected to a first stage evaporation which is carried out at a pressure of from 2.71 to 3.68 p.s.i.a. to provide a partially dehydrated urea containing from 4 to 6 percent by weight of water and a temperature within the range from 245° F. to 260° F. The first stage evaporation can be carried out in any conventional evaporator of the type which is used to evaporate heat-sensitive materials. Suitably the evaporator is a centrifugal thin-film unit, of which various types are described in Paper No. 57–HT–22 by Gudheim and Donovan, Heat Transfer in Thin-Film, Centrifugal Processing Units presented at the ASME-AIChE Joint Heat Transfer Conference, August 11–14, 1957, State College, Pennsylvania.

In the second stage of the third embodiment of our process, the partially dehydrated urea produced in the first stage, containing from 4 to 6 percent by weight of water and having a temperature within the range from 245° F. to 260° F., is subjected to a second staged evaporation to provide a more completely dehydrated urea of low tendency to pick up water and of low biuret content. This dehyrated urea can be flaked, pelletized or granulated in the conventional manner. On the other hand, the dehydrated urea can then be fed in molten form to a prilling tower to form urea prills of the desired characteristics with respect to mechanical strength, density, water absorption and biuret content. The second stage evaporation is carried out at least than 1.36 p.s.i.a. to produce molten urea containing not more than 1.5 percent by weight of water (preferably not more than 0.5 percent by weight of water and generally from 0.25 to 0.75 percent by weight of water) and having a temperature within the range from 270° F. to 285° F. Here again, the second stage evaporation step can be carried out in any conventional evaporator which is suitable for use in the evaporation of heat sensitive materials, particularly a centrifugal thin-film evaporation unit.

In each of the two evaporations, the operation is carried out in such manner that the vapor pressure of water over the urea melt is greater than the water vapor pressure which would be in equilibrium with the urea melt at its crystallization temperature as evaporation progresses but not more than 20 mm. of mercury (generally 5 to 20 mm. of mercury) greater than the said equilibrium water vapor pressure when the water concentration in the melt is less than 10 percent by weight. When the operation is performed in this manner, biuret formation in the urea melt thus evaporated is minimized while at the same time the formation of urea crystals during the evaporation is avoided.

EXAMPLE VII

Figure 5:
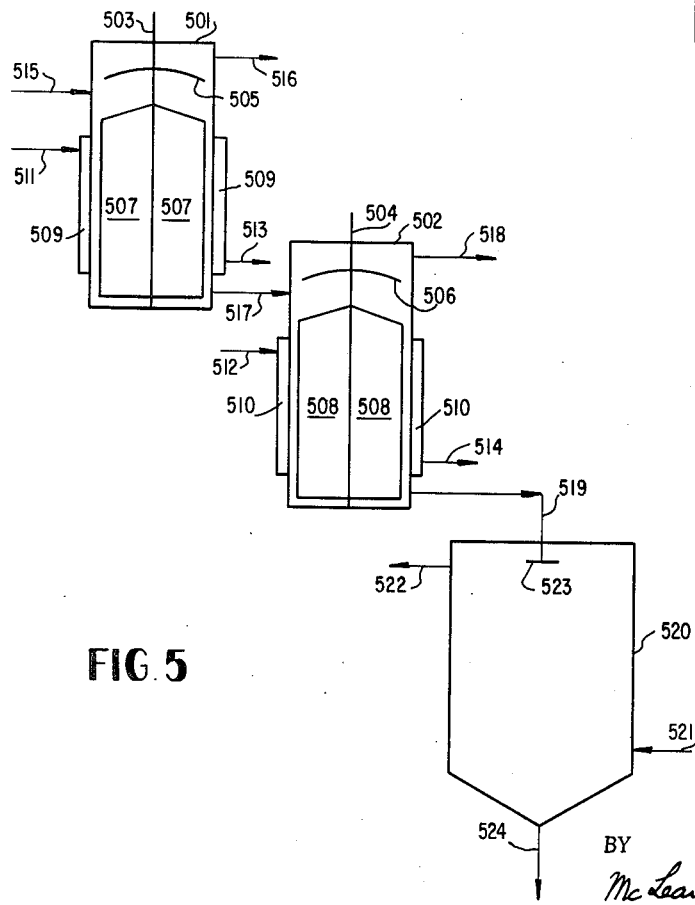

This example is to be considered in connection with FIGURE 5 of the accompanying drawing as exemplifying the third embodiment of the present invention. In the drawing, the numerals 501 and 502 represent vertical, straight-sided centrifugal thin-film evaporation units which are provided, respectively, with rotating shafts 503 and 504 having attached thereto centrifugal separators 505 and 506 and rotating plates 507 and 508. Exaporation units 501 and 502 are also provided, respectively, with heating jackets 509 and 510 into which the steam required for evaporating the water is introduced through lines 511 and 512, condensate being removed through lines 513 and 514.

Through line 515 there is passed at the rate of 5 tons per hour a urea melt produced in the conventional manner. This urea melt contains 15 percent by weight of water, the remainder being essentially urea, and is at a temperature of 250° F. Water vaporized in evaporator 501 is removed by means of line 516 which is connected to a suitable source of vacuum operated in such manner that the pressure in evaporator 501 is 3.5 p.s.i.a. The partially dehydrated urea passes in molten form through line 517, and has a water content of 5 percent by weight and a temperature of 253° F.

By means of line 517 the partially dehydrated urea melt is introduced in molten form into second stage evaporator 502, which is provided with vapor outlet 518 connected to a suitable source of vacuum. Evaporator 502 is operated at a pressure of 0.5 p.s.i.a., and the molten urea dehydrated therein, pumped through line 519 by means not shown, contains 0.5 percent by weight of water and is at a temperature of 280° F. The molten urea flowing through line 519 is a desirable feed to a flaking, pelletizing or granulation operation. However, in the process of this example it is subjected to prilling.

The numeral 520 represents a conventional prilling tower, suitably having a diameter of approximately 40 feet and a height of 100 feet. Atmospheric air is introduced into tower 520 by means of line 521 and removed by means of line 522. The numeral 523 represents a conventional rotating device of the type conventionally used in prilling towers for the purpose of finely dividing the molten urea so that it will be formed into prills when falling downwardly through the tower countercurrent to the air. In tower 520 conditions are adjusted in such manner that the urea prills collected at the bottom of the tower are cooled to a temperature of from approximately 120 to 150° F. The prills are removed from the bottom of the tower by means of line 524 and are dense, hard, mechanically strong, of low tendency to pick up water and have biuret content of approximately 0.9 percent by weight.

In building a plant, it is advisable that lines 517 and 519 be made as short as possible in order that biuret formation between the first and second evaporation stages and between the second evaporation stage and the prilling tower will be minimized.

In accordance with the fourth embodiment of our process, such a melt is subjected to a first stage evaporation which is carried out at a pressure of from 2.71 to 3.68 p.s.i.a. to provide a partially dehydrated urea containing from 4 to 6 percent by weight of water and having a temperature within the range from 245° F. to 260° F. The first stage evaporation can be carried out in any conventional evaporator of the type which is used to evaporate heat-sensitive materials. Suitably the evaporator is a centrifugal thin-film unit, of which various types are described in Paper No. 57–HT–22 by Gudheim and Donovan, Heat Transfer in Thin-Film, Centrifugal Processing Units presented at the ASME–AIChE Joint Heat Transfer Conference, August 11–14, 1957, State College, Pennsylvania.

In the second stage of the fourth embodiment of our process, the partially dehydrated urea produced in the first stage, containing from 4 to 6 percent by weight of water and having a temperature within the range from 245° F. to 260° F., is subjected to a second stage evaporation to provide a more completely dehydrated urea of low tendency to pick up water and of low biuret content. This dehydrated urea can be flaked, pelletized or granulated in the conventional manner. On the other hand, the more completely dehydrated urea can then be fed in molten form to a prilling tower to form urea prills of the desired characteristics with respect to mechanical strength, density, water absorption and biuret content. The second stage evaporation is carried out at from 4 to 19.7 p.s.i.a. to produce molten urea containing not more than 1.5 percent by weight of water (preferably not more than 0.5 percent by weight of water and generally from 0.25 to 0.75 percent by weight of water) and having a temperature within the range from 270° F. to 285° F., this being effected while passing the molten urea undergoing dehydration countercurrently to a stream of air or other inert gas such as flue gas, ammonia, nitrogen, carbon dioxide and the like. Here again, the second stage evaporation step is carried out in apparatus which is suitable for use in the evaporation of heat sensitive materials, particularly a centrifugal thin-film evaporation unit. The inert gas may be pre-heated to an elevated temperature before contact with the urea melt, for example about 280° F.

In each of the two evaporations in the fourth embodiment of our process, the operation is carried out in such manner that the vapor pressure of water over the urea melt is greater than the water vapor pressure which would be in equilibrium with the urea melt at its crystallization temperature as evaporation progresses but not more than 20 mm. of mercury (generally 5 to 20 mm. of mercury) greater than the said equilibrium water vapor pressure when the water concentration in the melt is less than 10 percent by weight. When the operation is performed in this manner, biuret formation in the urea melt thus evaporated is minimized while at the same time the formation of urea crystals during the evaporation is avoided.

EXAMPLE VIII

This example is to be considered in connection with FIGURE 6 of the accompanying drawing as exemplifying the fourth embodiment of the present invention.

In the drawing, the numerals 601 and 602 represent vertical, straight-sided centrifugal thin-film evaporation units which are provided, respectively, with rotating shafts 603 and 604 having attached thereto centrifugal separators 605 and 606 and rotating plates 607 and 608. Evaporation units 601 and 602 are also provided, respectively, with heating jackets 609 and 610 into which the steam required for evaporating the water is introduced through lines 611 and 612, condensate being removed through lines 613 and 614.

Through line 615 there is passed at the rate of 5 tons per hour a urea melt produced in the conventional manner. This urea melt contains 15 percent by weight of water, the remainder being essentially urea, and is at a temperature of 250° F. Water vaporized in evaporator 601 is removed by means of line 616 which is connected to a suitable source of vacuum operated in such manner that the pressure in evaporator 601 is 3.5 p.s.i.a. The partially dehydrated urea in molten form is pumped through line 617 by means not shown, and has a water content of 5 percent by weight and a temperature of 253° F.

By means of line 617 the partially dehydrated urea melt is introduced into second stage evaporator 602, which is provided with vapor outlet 618 connected to a suitable source of vacuum. Evaporator 602 is operated at a pressure of 9 p.s.i.a., and the molten urea dehydrated therein, pumped in molten form through line 619, contains 0.5 percent by weight of water and is at a temperature of 280° F. Through line 620 there is introduced air having a temperature of 280° F. at the rate of approximately 1500 pounds per hour, although this amount can vary within the range from 800 pounds per hour to 4000 pounds per hour or even more or less depending upon the particular equipment being used. The molten urea flowing through line 619 is a desirable feed to a flaking, pelletizing or granulation operation. However, in the process of this example it is subjected to prilling.

The numeral 621 represents a conventional prilling tower, suitably having a diameter of approximately 40 feet and a height of 100 feet. Atmospheric air is introduced into tower 622 and is removed by means of line 623. The numeral 624 represents a conventional rotating device of the type conventionally used in prilling towers for the purpose of finely dividing the molten urea so that it will be formed into prills when falling downwardly through the tower countercurrent to the air. In tower 621, conditions are adjusted in such manner that the urea prills collected at the bottom of the tower are cooled to a temperature of from approximately 120° to 150° F. The prills are removed from the bottom of the tower by means of line 625 and are dense, hard, mechanically strong, of low tendency to pick up water and have a biuret content of approximately 0.9 percent by weight.

In building a plant, it is advisable that lines 617 and 619 be made as short as possible in order that biuret formation between the first and second evaporation stages and between the second evaporation stage and the prilling tower will be minimized.

In accordance with the fifth embodiment of our process, such a melt is subjected to a first stage evaporation which is carried out at a pressure of from 4 to 19.7 p.s.i.a. to provide a partially dehydrated urea containing from 7 to 10 percent by weight of water and having a temperature within the range from 230° F. to 250° F. The first stage evaporation is carried out while the urea is flowing concurrently with air. Suitably the evaporator is a centrifugal thin-film unit, of which various types are described in Paper No. 57-HT-22 by Gudheim and Donovan, Heat Transfer in Thin-Film, Centrifugal Processing Units presented at the ASME-AIChE Joint Heat Transfer Conference, August 11-14, 1957, State College, Pennsylvania.

In the second stage of the fifth embodiment of our process, the partially dehydrated urea produced in the first stage, containing from 7 to 10 percent by weight of water and having a temperature within the range from 230° F. to 250° F., is subjected to a second stage evaporation to provide a more completely dehydrated urea which can then be fed in molten form to a prilling tower to form urea prills of the desired characteristics with respect to mechanical strength, density, water absorption and biuret content. The second stage evaporation is carried out at from 4 to 19.7 p.s.i.a. to produce molten urea containing from 0.25 to 1.5 percent by weight of water and having a temperature within the range from 270° F. to 285° F., this step being effected while the urea is flowing countercurrently to air. Here again, the second stage evaporation step can be carried out in any conventional evaporator which is suitable for use in the evaporation of heat sensitive materials, particularly a centrifugal thin-film evaporation unit.

EXAMPLE IX

This example is to be considered in connection with FIGURE 7 of the accompanying drawing as exemplifying the fifth embodiment of our process.

In the drawing, the numeral 701 represents a horizontal, forward taper centrifugal thin-film evaporation unit and the numeral 702 represents a vertical, straight-sided centrifugal thin-film evaporation unit. These evaporation units are provided, respectively, with rotating shafts 703 and 704 having attached thereto centrifugal separators 705 and 706 and rotating plates 707 and 708. Evaporation units 701 and 702 are also provided, respectively, with heating jackets 709 and 710 into which the steam required for evaporating the water is introduced through lines 711 and 712, condensate being removed through lines 713 and 714. In addition, evaporation units 701 and 702 are provided, respectively, with lines 715 and 716 for the introduction of the air contacted with the urea being dehydrated.

Through line 717 there is passed at the rate of 5 tons per hour a urea melt produced in the conventional manner. This urea melt contains 15 percent by weight of water, the remainder being essentially urea, and is at a temperature of 250° F. Air is introduced having a temperature of 240° F. into line 715 at the rate of 600 pounds per hour, although this amount may vary generally within the range from 400 pounds per hour to 1800 pounds per hour or even somewhat more or less, depending upon the particular equipment being used. Evaporator 701 operates at a pressure of 7 p.s.i.a., and water vaporized in evaporator 701, along with the air introduced into that evaporator, is removed by means of line 718 which is connected to a suitable source of vacuum. The partially dehydrated urea is pumped in molten form through line 719 by means not shown, and has a water content of 9 percent by weight and a temperature of 240° F.

By means of line 719 the partially dehydrated urea melt is introduced into a second stage evaporator 702. Through line 716 air having a temperature of 280° F. is introduced at the rate of 1500 pounds per hour, although here again this amount can vary generally within the range from 400 pounds per hour to 1800 pounds per hour or even somewhat more or less depending upon conditions. Evaporator 702 is operated at a pressure of 9 p.s.i.a., this being accomplished by connecting to a suitable source of vacuum line 720 through which the water vapor and the air introduced into evaporator pass. The urea pumped in molten form through line 721 is at a temperature of 280° F. and contains 0.5 percent by weight of water.

The numeral 722 represents a conventional prilling tower, suitably having a diameter of approximately 40 feet and a height of 100 feet. Atmospheric air is introduced into tower 722 by means of line 723 and is removed by means of line 724. The numeral 725 represents a conventional rotating device of the type conventionally used in prilling towers for the purpose of finely dividing the molten urea so that it will be formed into prills when falling downwardly through the tower countercurrent to the air. In tower 722, conditions are adjusted in such manner that the urea prills collected at the bottom of the tower are cooled to a temperature of from approximately 120° F. to 150° F. The prills are removed from the bottom of the tower by means of line 726 and are dense, hard, mechanically strong, of low tendency to pick up water and have a biuret content of approximately 0.9 percent by weight.

In building a plant, it is advisable that lines 719 and 721 be made as short as possible in order that biuret formation between the first and second evaporation stages and between the second evaporation stage and the prilling tower will be minimized.

In accordance with a sixth embodiment of our process, such a melt is subjected to a first stage evaporation which is carried out at a pressure of from 3.85 to 4.25 p.s.i.a. to provide a partially dehydrated urea containing from 4 to 6 percent by weight of water and having a temperature within the range from 260° F. to 300° F. The first stage evaporation can be carried out in any conventional evaporator of the type which is used to evaporate heat-sensitive materials. Suitably the evaporator is a centrifugal thin-film unit, of which various types are described in Paper No. 57–HT–22 by Gudheim and Donovan, Heat Transfer in Thin-Film, Centrifugal Processing Units presented at the ASME-AIChE Joint Heat Transfer Conference, August 11–14, 1957, State College, Pennsylvania.

In the second stage of the sixth embodiment of our process, the partially dehydrated urea produced in the first stage, containing from 4 to 6 percent by weight of water and having a temperature within the range from 260° F. to 300° F., is subjected to a second stage evaporation at a pressure of from 1.9 to 2.8 p.s.i.a. to provide a more completely dehydrated urea feed which contains from 1.5 to 3.0 percent by weight of water and which has a temperature within the range from 280° F. to 310° F. Here again, the second stage evaporation step is carried out in apparatus which is suitable for use in the evaporation of heat sensitive materials, particularly a centrifugal thin-film evaporation unit.

In accordance with our process, the more completely dehydrated urea produced in the second stage is subjected to a flashing operation which is carried out at a pressure within the range from 0.2 to 0.5 p.s.i.a This flashing operation provides a substantially completely dehydrated urea which contains from 0.25 to 1.0 percent by weight of water and has a temperature within the range from 270° F. to 285° F. The substantially completely dehydrated urea produced as a result of the flashing operation can then be fed in molten form to a prilling tower to provide urea prills of the desired characteristics with respect to mechanical strength, density, water absorption and biuret content.

EXAMPLE X

This example is to be considered in connection with FIGURE 8 of the accompanying drawings as exemplifying the sixth embodiment of the present invention.

In the drawing, the numerals 801 and 802 represent vertical, straight-sided centrifugal thin-film evaporation units which are provided, respectively, with rotating shafts 803 and 804 having attached thereto centrifugal separators 805 and 806 and rotating plates 807 and 808. Evaporation units 801 and 802 are also provided, respectively, with heating jackets 809 and 810 into which the steam required for evaporating the water is introduced through lines 811 and 812, condensate being removed through lines 813 and 814.

Through line 815 there is passed at the rate of 5 tons per hour a urea melt produced in the conventional manner. This urea melt contains 15 percent by weight of water, the remainder being essentially urea, and is at a temperature of 250° F. Water vaporized in evaporator 801 is removed by means of line 816 which is connected to a suitable source of vacuum operated in such manner that the pressure in evaporator 801 is 4 p.s.i.a. The partially dehydrated urea passes in molten form through line 817 and has a water content of 4 percent by weight and a temperature of 280° F.

By means of line 817 the partially dehydrated urea melt is introduced into second stage evaporator 802 which is provided with vapor outlet 818 connected to a suitable source of vacuum. Evaporator 802 is operated at a pressure of 2 p.s.i.a., and the molten urea dehydrated therein, passing through line 819, contains 1.5 percent by weight of water and is at a temperature of 310° F.

The more completely dehydrated urea passing through line 819 is introduced into flash drum 820 which is provided with vapor outlet 821 for removing water vapor. Line 821 is connected to a suitable source of vacuum to maintain the pressure in flash drum 820 at 0.3 p.s.i.a. The molten urea dehydrated in flash drum 820 is pumped through line 822 and has a water content of 0.5 percent by weight and a temperature of 285° F.

The numeral 823 represents a conventional prilling tower, suitably having a diameter of approximately 40 feet and a height of 100 feet. Atmospheric air is introduced into tower 823 by means of line 824 and is removed by means of line 825. The numeral 826 represents a conventional rotating device of the type commonly used in prilling towers for the purpose of finely dividing the molten urea so that it will be formed into prills when falling downwardly through the tower countercurrent to the air. In tower 823, conditions are adjusted in such manner that the urea prills collected at the bottom of the tower are cooled to a temperature of from 120° F. to 150° F. The prills are removed from the bottom of the tower by means of line 827 and are dense, hard, mechanically strong, of low tendency to pick up water and have a biuret content of approximately 0.9 percent by weight.

In building a plant, it is advisable that lines 817, 819, and 822 be made as short as possible in order that biuret formation between the two evaporation steps, between the last evaporation step and the flashing step and between the flashing and prilling steps will be minimized.

It is claimed:

1. In the manufacture of urea prills wherein a urea melt is dehydrated and then fed to a prilling tower to form urea prills, the dehydration step consisting essentially of subjecting a urea melt containing about 5 percent to 30 percent by weight of water, the remainder being essentially urea, and having a temperature of from about 200° F. to 290° F., to evaporation at a pressure of from 4 to 19.7 p.s.i.a. while flowing countercurrent to a stream of inert gas to provide a partially dehydrated urea containing not more than 1.5 percent by weight of water and having a temperature within the range from 270° F. to 310° F.; said evaporation being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

2. The method of claim 1 wherein the inert gas is air, the urea melt has a temperature of about 200 to 260° F.

and the partially dehydrated urea has a temperature of about 275 to 310° F.

3. The method of claim 2 wherein said partially dehydrated urea contains from 0.25 to 0.5 percent by weight of water and the dehydrated urea has a temperature of about 270 to 285° F.

4. The method of claim 2 wherein the urea melt is subjected to evaporation for a period less than about 20 seconds and the dehydrated urea contains less than about 1% biuret.

5. The method of claim 4 wherein the urea melt is subjected to evaporation for a period less than about 10 seconds and the dehydrated urea has a temperature from about 295 to 305° F. and contains less than about 0.85% biuret.

6. The method of claim 2 wherein the urea melt subjected to the dehydration step is prepared by heating a mixture of carbamate, urea and water at temperatures from about 250 to 275° F. and a pressure of 50 to 300 p.s.i.g., for about 20 to 30 seconds to produce a liquid product containing urea, recovering said liquid product and further heating said liquid product at a temperature of about 200 to 260° F. and pressure of about 0 to 12 p.s.i.g. for about 1 to 5 seconds to produce said melt containing less than about 0.5 percent biuret.

7. The method of claim 4 wherein the dehydrated urea has a temperature from about 295 to 305° F. and the air flow is 0.3 to 8 pounds per pound of water to be removed, and is preheated to a temperature of 260 to 310° F.

8. In the manufacture of urea prills wherein a urea melt is dehyrated and then fed to a prilling tower to form urea prills, the dehydration steps consisting essentially of subjecting a urea melt containing about 5 percent to 30 percent by weight of water, the remainder being essentially urea, and having a temperature of from about 200° F. to 290° F., to evaporation at a pressure of from 4 to 19.7 p.s.i.a. while flowing countercurrent to a stream of inert gas to provide a partially dehydrated urea containing from 0.25 to 1.5 percent by weight of water and having a temperature within the range from 270° F. to 310° F., and thereafter subjecting the partially dehydrated urea to a second evaporation step at a pressure of from 5 to 13 mm. of mercury absolute to provide a more completely dehydrated urea containing not more than 0.20 percent by weight of water and having a temperature of from 272° F. to 310° F.; said evaporation being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

9. The method of claim 8 wherein said inert gas is air with a dew point less than about 60° F. and said more completely dehydrated urea contains from 0.15 to 0.20 percent by weight of water.

10. In the manufacture of urea prills wherein a urea melt is dehydrated and then fed to a prilling tower to form urea prills, the dehydration step consisting essentially of subjecting a urea melt containing about 5% to 30% by weight of water, the remainder being essentially urea, and having a temperature of from about 200° F. to 260° F., to evaporation at a pressure of from 4 to 19.7 p.s.i.a. while flowing countercurrent to a stream of air with a dew point less than about 60° F. to provide a partially dehydrated urea containing from about 0.25 to 0.5% by weight of water and having a temperature within the range of about 275° to 310° F.; said evaporation being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

11. The method of claim 10 wherein the urea melt is subjected to evaporation for a period less than about 10 seconds and the dehydrated urea contains less than about 0.85% biuret.

12. In the manufacture of urea prills wherein a urea melt is dehydrated while avoiding the crystallization of urea by the dehydration steps including a first dehydration step of subjecting a urea melt containing about 5 percent to 30 percent by weight of water, the remainder being essentially urea, and having a temperature of from 200° F. to 290° F. to a first-stage vacuum evaporation at a pressure of from 3.85 to 4.25 p.s.i.a. to provide a partially dehydrated urea containing from 2 to 3 percent by weight of water and having a temperature within the range from 290° F. to 310° F.; further dehydrating the urea in a second dehydration step; and then feeding the urea to a prilling tower wherein urea prills are formed; the second dehydration step consisting essentially of flashing the partially dehydrated urea from the first dehydration step at an absolute pressure of from about 0.2 to 0.5 p.s.i.a. to provide a more completely dehydrated urea containing from 0.25 to 1.0 percent by weight of water and having a temperature within the range from 270° F. to 285° F.; the second dehydration step being characterized by evaporating the urea melt at said conditions and in such manner that the vapor pressure of water over the urea melt is greater than the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

13. In the manufacture of urea prills wherein a urea melt is dehydrated by the dehydration steps including a first dehydration step of subjecting a urea melt containing about 5 percent to 30 percent by weight of water, the remainder being essentially urea, and having a temperature of from about 200° F. to 290° F., to a first-stage vacuum evaporation at a pressure of from 2.71 to 3.68 p.s.i.a. to provide a partially dehydrated urea containing from 4 to 6 percent by weight of water and a temperature within the range from 245° F. to 260° F., thereafter subjecting the partially dehydrated urea to a second vacuum evaporation step to provide a more completely dehydrated urea and then feeding the urea to a prilling tower wherein urea prills are formed; the second evaporation step comprising subjecting the urea from the first evaporation step to an absolute pressure of less than 1.36 p.s.i.a. to provide a more completely dehydrated urea containing not more than 1.5 percent by weight of water and having a temperature of from 270 to 285° F.; said evaporations being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

14. The method of claim 13 wherein said more completely dehydrated urea contains from 0.25 to 0.75 percent by weight of water.

15. In the manufacture of urea prills wherein a urea melt is dehydrated by the dehydration steps including a first dehydration step of subjecting a urea melt containing about 5% to 30% by weight of water to vacuum dehydration conditions and thereafter subjecting the partially dehydrated urea to a second evaporation step at a pressure of from 4 to 19.7 p.s.i.a. while flowing countercurrent to a stream of inert gas to provide a more completely dehydrated urea containing not more than 1.5% by weight of water and having a temperature of from 270 to 285° F., and then feeding the urea melt to a prilling tower wherein urea prills are formed; the first dehydration step consisting essentially of subjecting a urea melt containing about 5% to 30% by weight of water, the remainder being essentially urea, and having a temperature of from about 200° F. to 290° F. to a pressure of from 2.71 to 3.68 p.s.i.a. to provide a partially dehydrated urea containing from 4 to 6% by weight of water and having a temperature within the range from 245° F. to 260° F.; said evaporations being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

16. The method of claim 15 wherein said inert gas is air and wherein said more completely dehydrated urea contains from 0.25 to 0.75 percent by weight of water.

17. In the manufacture of urea prills wherein a urea melt is dehydrated and then fed to a prilling tower wherein prills are formed, the improvement consisting essentially of dehydrating a urea melt while avoiding the crystallization of urea by the dehydration steps of subjecting a urea melt containing from about 10 to 30% by weight of water, the remainder being essentially urea, and having a temperature of about 200° F. to 290° F. to a first stage evaporation at a pressure of from 4.0 to 19.7 p.s.i.a. while flowing concurrently with a stream of air to provide a partially dehydrated urea containing from 7 to 10% by weight of water and having a temperature within the range from about 230° F. to 250° F. and thereafter subjecting the partially dehydrated urea to a second dehydration step at a pressure from about 4 to 19.7 p.s.i.a. while flowing countercurrently to a stream of air to provide a more completely dehydrated urea containing from 0.25 to 1.5% by weight of water and having a temperature of from 270° F. to 285° F.; said evaporations being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

18. In the manufacture of urea prills wherein a urea melt is dehydrated while avoiding the crystallization of urea by the dehydration steps including a first dehydration step of subjecting a urea melt containing about 5% to 30% by weight of water, the remainder being essentially urea, and having a temperature of from about 230° F. to 250° F. to a first-stage vacuum evaporation at a pressure of from 3.85 to 4.25 p.s.i.a. to provide a partially dehydrated urea containing from 4% to 6% by weight of water and having a temperature within the range of from 260° F. to 300° F.; further dehydrating the urea from the first-stage in a second-stage vacuum evaporation at a pressure of from 1.9 to 2.8 p.s.i.a. to provide more completely dehydrated urea containing from 1.5 to 3.0% by weight of water and having a temperature of from 280° F. to 310° F.; and further dehydrating the urea in a third dehydration step; and then feeding the urea to a prilling tower wherein urea prills are formed; the third dehydration step consisting essentially of flashing the partially dehydrated urea from the second dehydration step at a pressure within the range of from 0.2 to 0.5 p.s.i.a to provide a flashed urea containing from 0.25 to 1.0% by weight of water and having a temperature of from 270° F. to 285° F.; the third dehydration step being characterized by evaporating the urea melt at said conditions and in such manner that the vapor pressure of water over the urea melt is greater than the water vapor pressure which would be in equilibrium with the urea melt at its crystallization temperature as evaporation progresses but not more than 20 mm. of mercury greater than the said equilibrium water-vapor pressure when the water concentration in the melt is less than 10% by weight, thereby minimizing biuret formation in the urea melt thus evaporated while at the same time avoiding the formation of urea crystals during the evaporation.

No references cited.

NICHOLAS S. RIZZO, *Primary Examiner.*